(12) United States Patent
Davies et al.

(10) Patent No.: US 8,838,496 B2
(45) Date of Patent: Sep. 16, 2014

(54) SYSTEMS AND METHOD FOR BIN-BASED RISK MANAGED TRADING

(75) Inventors: James L. Davies, Aldbury (GB); Marc E. Millington-Buck, Küssnacht am Rigi (CH)

(73) Assignee: Trayport Limited (GB)

( * ) Notice: Subject to any disclaimer, the term of this patent is extended or adjusted under 35 U.S.C. 154(b) by 82 days.

(21) Appl. No.: 13/604,214

(22) Filed: Sep. 5, 2012

(65) Prior Publication Data

US 2014/0067640 A1    Mar. 6, 2014

(51) Int. Cl.
*G06Q 40/00*    (2012.01)

(52) U.S. Cl.
CPC ..................................... *G06Q 40/00* (2013.01)
USPC .............................. 705/37; 705/35; 705/36 R (58) Field of Classification Search
None
See application file for complete search history.

(56) References Cited

U.S. PATENT DOCUMENTS

| | | | |
|---|---|---|---|
| 8,412,614 B2 * | 4/2013 | Bullinger et al. | 705/37 |
| 2002/0198823 A1 * | 12/2002 | Laederich et al. | 705/38 |
| 2003/0004863 A1 * | 1/2003 | Cliff | 705/37 |
| 2003/0055776 A1 * | 3/2003 | Samuelson | 705/37 |
| 2004/0153388 A1 * | 8/2004 | Fisher et al. | 705/36 |
| 2004/0162774 A1 * | 8/2004 | Golden | 705/36 |
| 2004/0220861 A1 * | 11/2004 | Morciniec et al. | 705/26 |
| 2007/0027787 A1 * | 2/2007 | Tripp | 705/36 |
| 2007/0100732 A1 * | 5/2007 | Ibbotson et al. | 705/37 |
| 2007/0255655 A1 * | 11/2007 | Kemper et al. | 705/39 |
| 2007/0288351 A1 * | 12/2007 | Huntley | 705/37 |
| 2008/0262956 A1 * | 10/2008 | De La Motte | 705/37 |
| 2009/0037345 A1 * | 2/2009 | Barker et al. | 705/36 R |
| 2009/0281876 A1 * | 11/2009 | Bullinger et al. | 705/10 |
| 2009/0327153 A1 * | 12/2009 | Milne | 705/36 R |
| 2010/0010927 A1 * | 1/2010 | Melby | 705/37 |
| 2012/0130882 A1 * | 5/2012 | Smith et al. | 705/37 |

* cited by examiner

*Primary Examiner* — Gregory Johnson
(74) *Attorney, Agent, or Firm* — Goodwin Procter LLP (57) ABSTRACT

Predefined exposure limits including an actual and a permitted maximum number of owned instrument units or that an entity is exposed are used to determine trade executability. A request for strips of financial instruments is received. A stepped graph is constructed for the financial instrument based on held positions, wherein one axis of the stepped graph represents a time period covering the strip of contracts and another axis represents a total exposure to the financial instrument. The received request is compared to the stepped graph to determine whether the permitted maximum number of investment units would be violated for one or more of the first units of time should the requested trade execute. The trade is then allowed to execute if no violation is determined, and blocked otherwise.

19 Claims, 8 Drawing Sheets

| Current Period Limits (700): | | | Next Period Limits (710): | |
|---|---|---|---|---|
| Month: | August | 200 | Month: | September | 250 |
| Quarter: | Q2 2012 | 350 | Quarter: | Q3 2012 | 650 |
| Season: | Summer 2012 | 1400 | Season: | Winter 2012/2013 | 1400 |
| Year: | 2012 | 2500 | Year: | 2013 | 2500 |

SYSTEMS AND METHOD FOR BIN-BASED RISK MANAGED TRADING

FIELD OF THE INVENTION

The invention relates generally to computerized trading methods and systems. More particularly, the present invention relates to trading methods and supporting computer systems for managing risks associated with trading financial instruments.

BACKGROUND

Traditional systems for enforcing risk limits on the trading of bonds and exchange listed derivatives employ set limits on the number of contracts or total financial position that a particular entity or trader can take. These limits typically take the form of so-called "clip size" limits, which prevent single trades above a pre-determined size (e.g., a single trade of 500 contracts). Additional "position" limits are used to prevent an entity from amassing a position above a certain size from a combination of multiple orders. Many systems use both clip size and position size limits as an initial filter to confirm that a potential order does not violate the limits.

These limitations are fairly straightforward to implement on routine financial instruments. In some instances, however, a particular trade may not violate the limits, but when grouped with a collection of other potential trades or existing positions, the limits are triggered. Moreover, because a particular trade may include multiple characteristics (class of instrument being traded, the period the instrument covers, the expiration of the instrument, the source of the trade request, etc.) one trade may implicate numerous potential risk limits.

As an example, some markets trade in derivative contracts that are constructed from a "strip" of contracts. Strip contracts allow for the sale or purchase of futures in sequential delivery months in a single security, thus allowing investors to secure conditions such as yields for a period of time equal to the length of the strip. In the electricity markets, a typical example might be a monthly delivery instrument for power, which is essentially a "strip" of daily delivery contracts, which may also be traded individually. The concept of a strip of contracts can be extended to quarterly contracts (each day in a quarter) annual contracts (each day in a year), etc.

Strip contracts may also cover overlapping delivery periods. For power delivery contracts, the overlapping periods might be "peak," "off-peak," and "baseload power." Peak contracts deliver power in the middle of the day for the working week, off-peak deliver power during night and evening periods and weekends, and baseload contracts cover the entire period. Therefore, an off-peak strip plus a peak strip is equivalent to a baseload strip, assuming they are each covering the same period. Thus, buying baseload and selling off-peak and peak for the same period is effectively a wash.

Because of the temporal component to these contracts, traditional risk management systems that are based on setting individual limits for each contract or for groups of contracts are inappropriate for the trading of contracts which purchased in overlapping strips. To compensate, companies managing risk using existing risk systems are limited to setting total limits across an entire class of instruments, as they do not know specifically what contracts are being traded. Thus, because the limits are set for weekly, monthly, quarterly and annual contracts across all instruments regardless of overlap, the company's exposure would in fact be much higher than otherwise permitted. This may then require the company to deposit more risk capital than was initially planned for, or, alternatively the risk management firm may offer lower limits than they would prefer given the cash on deposit.

What is needed, therefore, is a methodology and supporting systems that consider the various possible groupings and overlapping nature of financial instruments when assessing the risk of proposed orders submitted into an exchange or other trade execution venue.

SUMMARY OF THE INVENTION

Various aspects of the invention provide a trade risk assessment methodology and supporting trade gateway and system for determining whether a particular trade violates certain risk constraints that otherwise limit the trading activities of participants on a trade execution venue. The techniques and systems allow one (or in some cases more than one) party to design and continually monitor trading rules that, when implemented, enforce risk-based trading policies. The rules may implement limits on the amount (in number of contracts and/or financial exposure) for a particular type of instrument, for a particular period, for a particular trader or group of traders, or an entity.

Furthermore, an individual trade has multiple characteristics that allow it to be classified into many different groups. For example, a request from a particular trader at a certain firm to purchase a Q4 2012 forward contract for delivery of electricity at 500 units may implicated multiple different limits that are placed on the trader, the firm, the product class, overall financial exposure during the contract (or portion of the contract) for the product class, and/or total financial exposure.

The system may be implemented as a remote service, in that trades are routed to a central location and the results are transmitted back to a trading entity for execution, locally at an individual trading desk or as a combination of a centralized risk gateway server and a plurality of local compliance engines that implement the risk management limits against local trading activities.

Accordingly, one aspect of the invention provides a method for determining whether a trade order is permitted according to a predefined exposure limitation. The method includes storing a set of instrument data that represents both an actual and a permitted maximum number of instrument units that are bought, sold short or that an entity is otherwise exposed to per a first unit of time. A request to execute a trade for one or more strips of financial instruments is received, where each strip includes the instrument units, each of which is associated with a second unit of time. A stepped graph is constructed for the financial instrument based on the stored instrument data, wherein one axis of the stepped graph represents a time period covering the strip of contracts and another axis represents a total exposure to the financial instrument. The received request is compared to the stepped graph to determine whether the permitted maximum number of investment units would be violated for one or more of the first units of time should the requested trade execute. The trade is then allowed to execute if no violation is determined, and blocked otherwise.

In some embodiments, the financial instruments comprise one or more of swaps for delivery of electricity, megawatt delivery hours or long-term power purchase agreements. The strip of contracts may span a non-contiguous block of time, and in some instances the second unit of time comprises a plurality of the first unit of time, e.g., the first unit may be a day and the second unit an hour (or block of hours), or, in other cases the second unit of time comprises a quarter-year and the first unit of time comprises a month. The instrument data representing a permitted maximum number of instrument units permitted per a first unit of time may include user-specified limits on overall exposure to a particular position for a current year, current season, current quarter, and current month, or, in some cases, may include default values at any level of granularity. The actual number of instrument units may be a total number of contracts owned that cover a particular time period or a total financial exposure during a particular time period. In some implementations, the set of instrument data may comprise limitations on trading positions applied by a prime broker, general clearing member, futures commission merchant or other credit provider across a plurality of trading entities wherein the credit provider provides the trading entities with access to an exchange, inter-dealer broker platform, swap execution facility or other trade execution venue on which the financial instrument is traded. In other instances, the set of instrument data representing a maximum number of instrument units permitted per a first unit of time includes individual limitations on trading positions for individual trading entities for which the credit provider provides access to a trade execution venue on which the financial instrument can be traded.

In another aspect, a system for determining whether a trade order is permitted according to a predefined exposure limitation includes a data storage server for storing a set of instrument data representing an actual and a permitted maximum number of instrument units per a first unit of time, a communications server for receiving a request to execute a trade for one or more strips of financial instruments each being described in instrument units which are associated with a second unit of time, memory for storing computer-executable instructions, and a processor for executing the instructions stored in the memory. Execution of the instructions by the processor implements a trade risk management application which constructs a stepped graph for the financial instrument based on the stored instrument data. One axis of the stepped graph represents a time period covering the strip of contracts and another axis represents a quantity of the units of the financial instrument. The application also compares the received request to the stepped graph to determine whether the permitted maximum number of investment units would be violated for one or more of the first units of time should the requested trade execute, allows the trade to execute if no violation is determined, and rejects the trade if a violation is determined.

In some implementations, the data storage server, communications server, memory and processor are hosted by a single entity at a central facility servicing a plurality of credit providers, each credit provider providing a plurality of trading entities access to an trade execution venue on which the financial instruments are traded. The data storage server, communications server, memory and at least one processor may be provided to each of a plurality of trading entities. Execution of the instructions in some cases further implements a fail-safe monitor for halting, or, in some cases, disallowing, all requested trades for the financial instrument should the set of instrument data representing a maximum number of instrument units become unavailable. In other implementations, the data storage server, communications server, memory and processor are hosted by a single entity at a central facility servicing a plurality of credit providers, each credit provider providing a plurality of trading entities access to an trade execution venue on which the financial instruments are traded.

In another aspect, the invention provides an article of manufacture having computer-readable program portions embedded thereon. The program portions include instructions for determining the executability of a proposed trade within a market according to certain risk limits. More specifically, the instructions implement a computer application for use in checking requested orders against defined risk limits by receiving a request to execute a trade for one or more strips of financial instruments, wherein the strips include the instrument units, each of which is associated with a second unit of time. The application also constructs a stepped graph for the financial instrument based on stored instrument data wherein one axis of the stepped graph represents a time period covering the strip of contracts and another axis represents a quantity of the units of the financial instrument, and compares the received request to the stepped graph to determine whether the permitted maximum number of investment units would be violated for one or more of the first units of time should the requested trade execute. The trade is allowed to execute if no violation is determined, and not allowed if a violation is determined.

BRIEF DESCRIPTION OF FIGURES

In the drawings, like reference characters generally refer to the same parts throughout the different views. Also, the drawings are not necessarily to scale, emphasis instead generally being placed upon illustrating the principles of the invention.

DETAILED DESCRIPTION

The invention provides various techniques and systems that allow for the management and use of trading rules that implement limits on exposure in pre-defined time-based periods that may not necessarily align with the time period of the instrument being traded. As an example, and as will be described in greater detail below, a trader may request an order for a contract for delivery of electricity during a calendar quarter. While there may be limits on an entity's exposure for a quarter, limits may also be desired at a more granular level, such as monthly, weekly, daily, peak periods and non-peak periods. In instances where a trading entity has certain risk-based limits in place (or, in some cases, placed upon them), each constituent component of a trade is analyzed to determine whether it will trigger one or more of the limits prior to execution. Thus, various embodiments of the invention facilitate the pre-screening of orders as they are entered by a trader and allow for greater control over a trading entities activities. This is especially important when a third party (e.g., a prime broker) is providing the trading entities with access to trade execution venues and, as a result, taking on certain risks associated with the execution of the orders. Data describing current exposure and the notational limits on positions over time are used to construct a graphical representation of the rules such that traders can visually compare proposed orders to the limits prior to execution.

These limits, and the risks that are inherent in possibly violating the limits, are especially relevant when trading derivative contracts that include a temporal component (e.g., a future delivery, a periodic delivery, etc.). For example, energy derivative contracts are based on or derived from an underlying energy asset, such as natural gas, crude oil, or electricity and are traded as futures and options, and over-the-counter (privately negotiated) derivatives such as forwards, swaps and options.

A future is a contract to deliver or receive a commodity (oil in the case of an oil future) at a defined point in the future. The price is agreed on the date the agreement is struck together with volume, duration, and contract index, whereas the price for the futures contract at the date of delivery (contract expiry date) may be different. At the expiry date, depending upon the contract specification the 'futures' owner may either deliver/receive a physical amount of the commodity, or they may settle in cash against an expiration price set by the trade execution venue or other responsible body (such as a clearing house), or they may have chosen to close out the contract prior to expiry and pay or receive the difference in the two prices. In futures markets, trades are processed on a formal exchange, where each participant has the same counterpart. A swap is a generalized agreement whereby one thing is exchanged for another. Usually in markets these are over agreed over a specified period. This may be the exchange of cash flows related to an index or the price of an asset, or it may be an agreement to exchange cash for an asset at a future date, or in the case of power the exchange of multiple payments of cash for the delivery of power at multiple points in time. The agreement defines the volume, duration, frequency, price, and any other economic variables. Types of swaps are also known as "contracts for differences" and as "fixed-for-floating" contracts—terms which summarize the essence of these financial arrangements. In a swap contract, it is common that a trader trades with a counterparty (which may be a company, an institution or an individual) and assume the risk on their capacity to pay the amount, or deliver/receive the asset that may be due at settlement.

Figure 1:
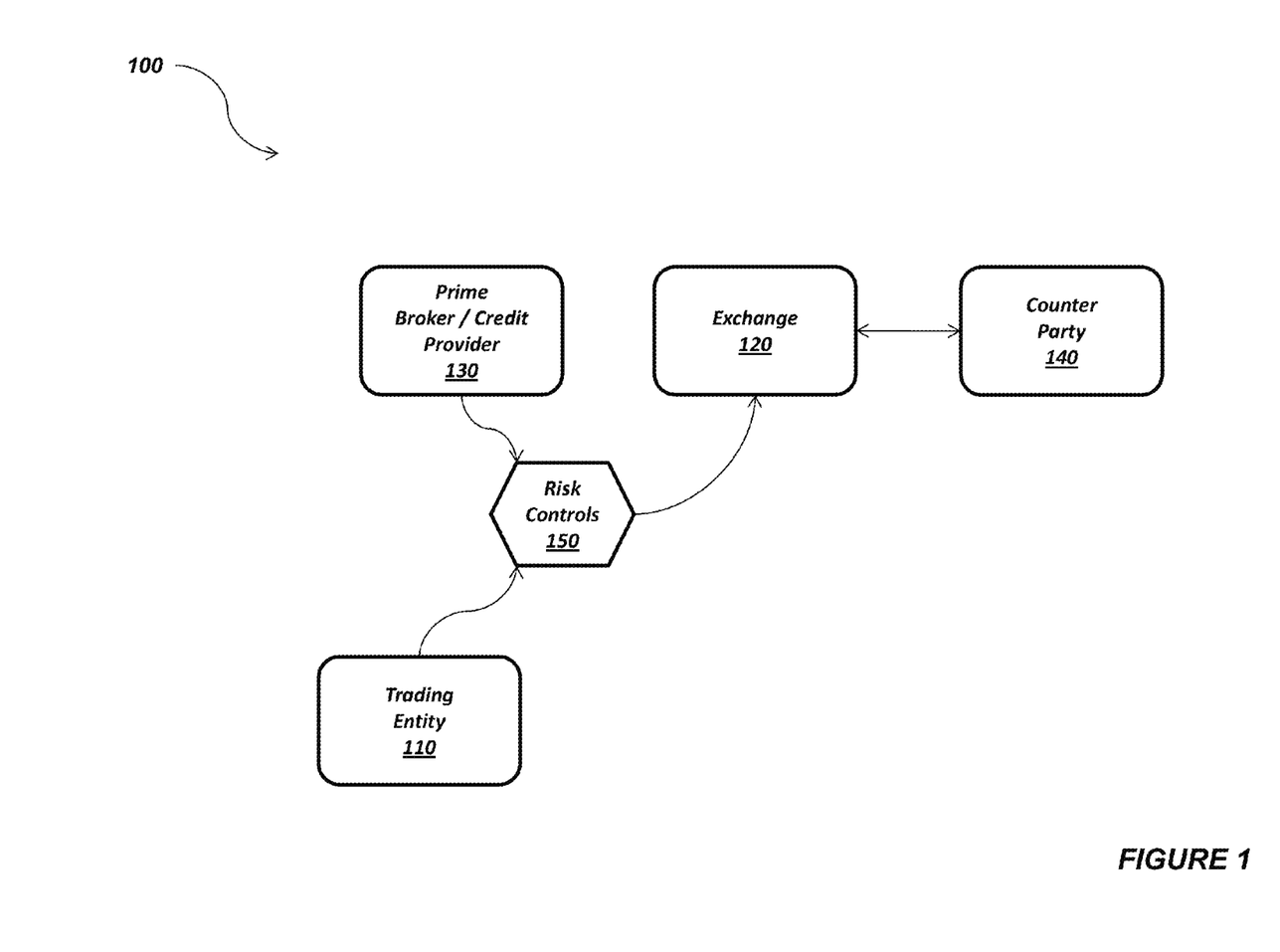
FIG. 1 illustrates a general arrangement of parties and functions within a trading environment in which various aspects of the invention operate.

Referring now to FIG. 1, there are many instances in which traders do not have direct access to the trade execution venues (and therefore the necessary counterparties) on which many of these more esoteric financial instruments are traded. For example and as general illustration of a trading ecosystem 100, a trading entity 110 such as a small hedge fund may wish to use commodity swaps (e.g., interest rate swaps) as a hedge against certain fixed-income positions, but may not have enough capital to have a dedicated seat on the trade execution venue 120 at which they are traded. In such cases, a third party, referred to herein as a credit provider 130, provides the fund 110 with access to the trade execution venue 120 and allows the fund 110 to trade using the credit provider's account. While the credit provider 130 typically charges a fee for providing the access, there are also risks that come with allowing others to trade on your name. One risk involves the existence (or non-existence) of credit agreements with the counterparties 140 with whom the fund 110 is trading via the trade execution venue if the trade execution venue is an OTC market. While each small fund may not have the means to negotiate and manage credit agreements with every other possible counterparty, large credit providers typically do have such agreements with most, if not all, trading parties. These agreements typically provide the basis for certain risk controls 150 that are put in place as a filter to make sure certain trading, credit and/or exposure limits are not violated.

Figure 2:
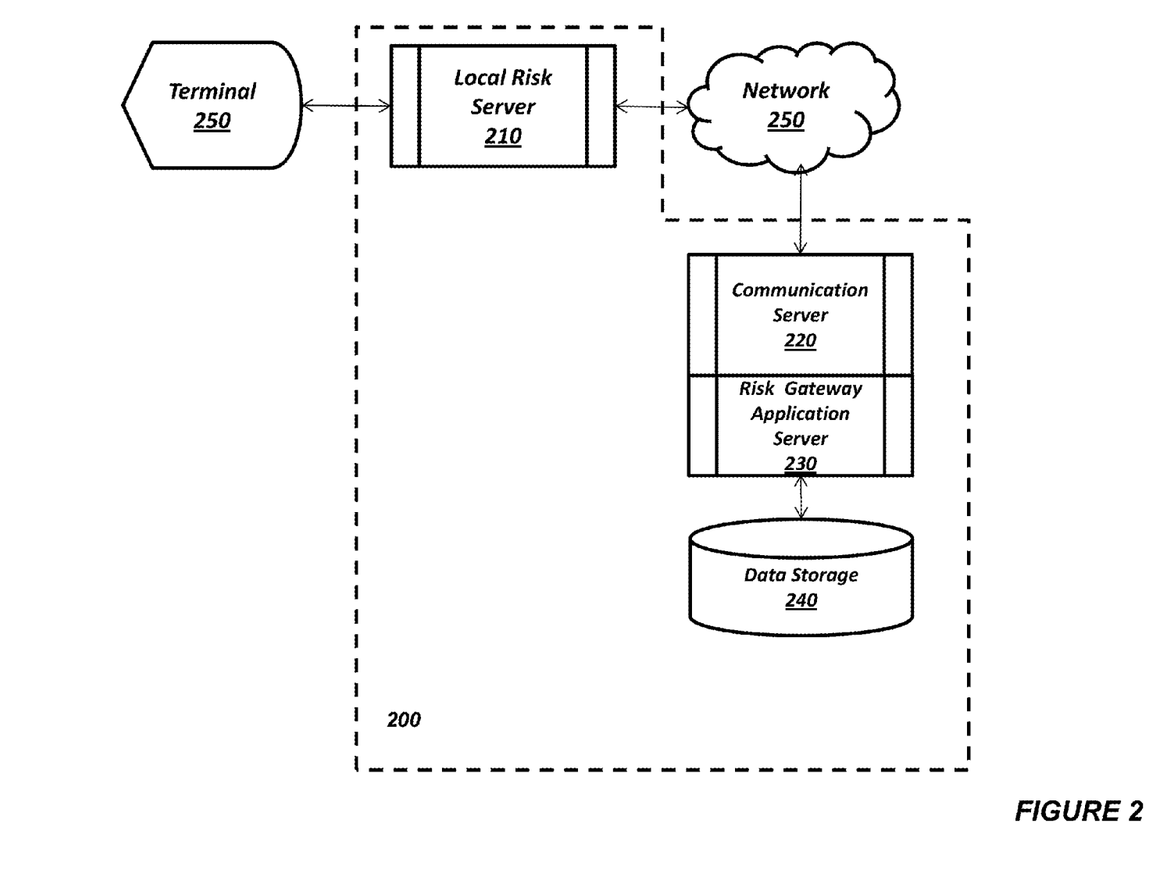
FIG. 2 is a schematic illustration of a system for implementing the analysis and execution of trades in accordance with one embodiment of the invention.

Referring to FIG. 2, a market access "gateway" system 200 is used to implement the risk controls in accordance with various embodiments of the invention. The system 200 includes a local risk server 210, a communication server 220, a risk gateway application server 230 and a data storage device 240. A local risk server 210 is generally implemented for each trading entity and communicates with one or more trading terminals 250. The terminals typically include one or more display devices (e.g., screens) and input mechanisms (keyboards, touchscreens, mice, etc.) that allow traders to interact with and view their trading positions in real or near-real time. In implementations in which the local risk server 210 (or multiple local risk servers) are deployed throughout a company, they may communication with each other and with the risk gateway application 230 via a network 250.

In some implementations, the local risk server 210 resides on a centrally-located server and presented to users via a client-server interface, whereas in other implementations the design and configuration functions may be provided as a client-resident application or applet. In some cases, some components of the local risk server 210 may remain on the server (e.g., security, database connectivity, etc.) whereas other functions (interface presentation, data entry confirmation, etc.) may execute locally. In some instances, one or more components of the system 200 may be implemented as a service, operating on a shared server (or on multiple virtual servers) operated by a single service provider.

The risk gateway application server 230 receives requested orders via a communications server 220 (e.g., a webserver) from trading counterparties and applies the trading rules against the parameters to determine if the trade is to be allowed. In some instances, if communication between the risk gateway server and the local risk server is interrupted, the trades may either be queued for processing once communication is reestablished, allowed until a predetermined risk threshold is met or rejected altogether. In instances where the orders are allowed to process despite a break in communication, the local risk server may not be aware of the most current positions of the trading entity, and therefore a threshold may be placed on the execution of orders. Such a threshold may be expressed in time (e.g., allow all trades for the next m minutes), volume (allow next n trades) or dollar amounts. Once the thresholds are reached, the trading is suspended until the communication between the system components can be reestablished.

In some embodiments, the system may, include one or more databases 240, which store data related to the market participants, existing positions, risk limits, instrument components, and trades. For instance, the database 240 may store information relating to users of the system, relationships among the users, market statistics, financial instrument definitions, credit rules among market participants, server availability, and network traffic information. The database 240 may also contain data regarding individual transactions, whether they be completed, pending, or open. Examples of databases that may be used to implement this functionality include, the PostgreSQL Database Server by the PostgreSQL Global Development Group of Berkeley, Calif., the MySQL Database Server and the ORACLE Database Server, both offered by ORACLE Corp. of Redwood Shores, Calif. Examples of web servers that may be used to implement the communication servers 220 include the Apache Tomcat webserver, the Oracle Weblogic server, and Microsoft's Internet Information Server.

The terminals 250 and servers 210, 220, 230 and 240 are preferably implemented as software running on a personal or professional grade computers (e.g., a PC with an INTEL processor or an APPLE MACINTOSH) capable of running such operating systems as the MICROSOFT WINDOWS family of operating systems from Microsoft Corporation of Redmond, Wash., the MACINTOSH OSX operating system from Apple Computer of Cupertino, Calif., and various varieties of Unix, such as SUN SOLARIS from SUN MICROSYSTEMS, and GNU/Linux from RED HAT, INC. of Durham, N.C. (and others). The terminals 250 may also be implemented on such hardware as a smart or dumb terminal, network computer, wireless device, personal data assistant, information appliance, workstation, minicomputer, mainframe computer, or other computing device, that is operated as a general purpose computer or a special purpose hardware device solely used for serving as a client interacting with the system 200.

A communications network 250 connects the various components of the system 200. The communication may take place via any media such as standard telephone lines, LAN or WAN links (e.g., T1, T3, 56kb, X.25), broadband connections (ISDN, Frame Relay, ATM), wireless links, and so on. Preferably, the network can carry TCP/IP protocol communications, and HTTP/HTTPS requests made by the client and the connection between the client and the server can be communicated over such TCP/IP networks. The type of network is not a limitation, however, and any suitable network may be used. Typical examples of networks that can serve as the communications network include a wireless or wired Ethernet-based intranet, a local or wide-area network (LAN or WAN), and/or the global communications network known as the Internet, which may accommodate many different communications media and protocols.

The system 200 may be implemented on one or more physical or virtual servers that provide the application processing component for implementing the techniques for determining the executability of trades as described herein. The server components are preferably implemented on one or more server class computers that have sufficient memory, data storage, and processing power and that run a server class operating system (e.g. SUN Solaris, GNU/Linux, MICROSOFT WINDOWS 2000, and later versions, or other such operating system). Other types of system hardware and software than that described here could also be used, depending on the capacity of the device and the number of users and the amount of data received. For example, the server may be part of a server farm or server network, which is a logical group of one or more servers. As another example, there could be multiple servers that may be associated or connected with each other, or multiple servers could operate independently, but with shared data. As is typical in large-scale systems, application software may be implemented in components, with different components running on different server computers, on the same server, or some combination.

The modules described throughout the specification can be implemented in whole or in part as a software program (or programs) operating on one or more processors using any suitable programming language or languages (C++, C#, java, Visual Basic, LISP, BASIC, PERL, etc.) and/or as a hardware device (e.g., ASIC, FPGA, processor, memory, storage and the like).

Figure 3:
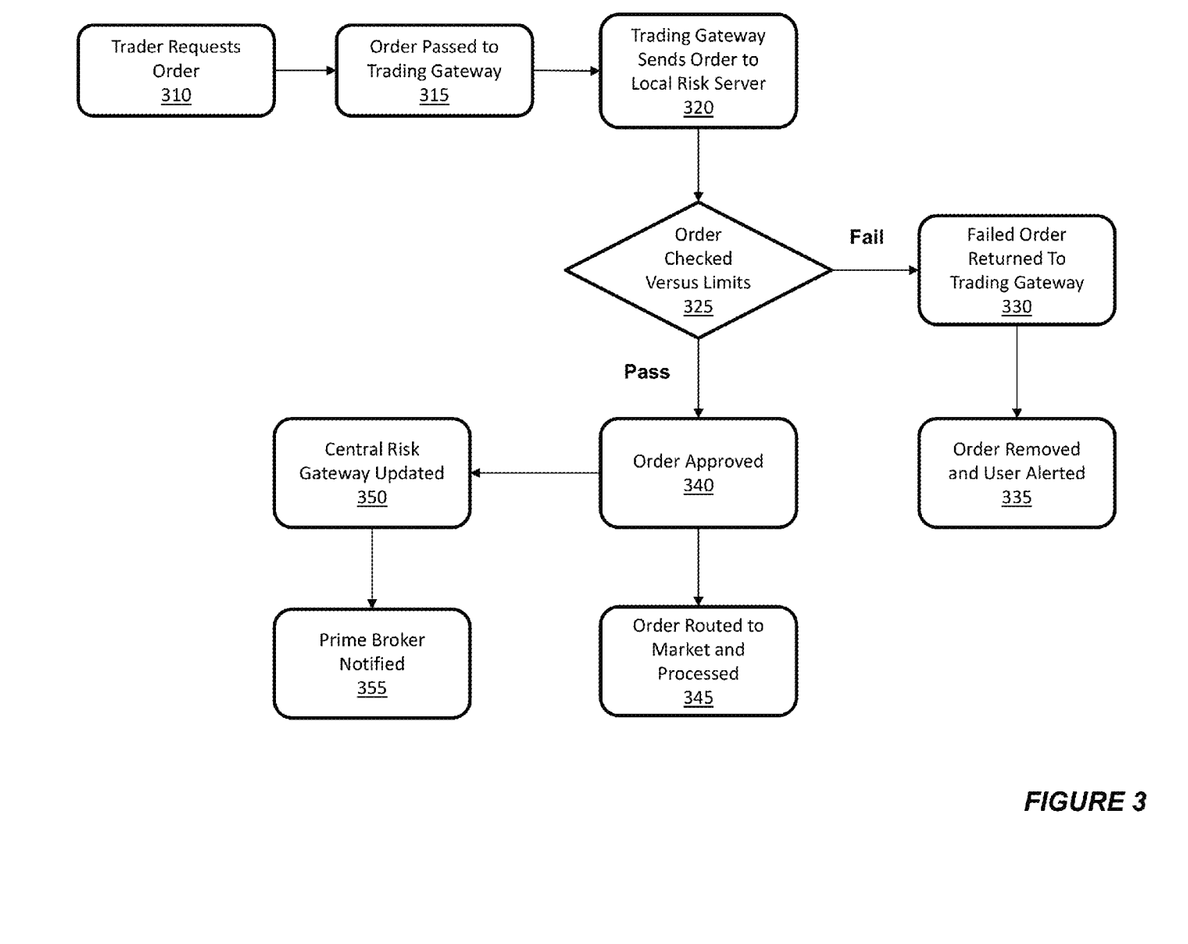
FIG. 3 is a flow chart generally illustrating the steps for determining whether a requested order is to be executed in accordance with one embodiment of the invention.

Referring now to FIG. 3, a process for determining whether or not a requested order may be filled is illustrated in general terms. Initially, a trader requests that an order be placed on an trade execution venue (STEP 310). The order is then passed from the trader's terminal to the trading gateway application (STEP 315) and then on to the local risk server (STEP 320). The local risk server has stored thereon the trading limits and other risk management rules that are used to determine whether a particular order will be executed. The local risk server then checks the current requested order against the specified limits (DECISION STEP 325). The limits may, as described in greater detail below, be specified at a certain time-based granularity—i.e., hourly for power delivery, or daily for oil delivery—and be used to determine whether contracts using other units of time (e.g., weekly, monthly, quarterly, etc.) are tradeable.

If the trade is deemed to violate one or more limits, it is tagged as a failed order and returned to the trading gateway (STEP 330), removed from the traders book of pending orders, and the trader is alerted accordingly (STEP 335). If, however, the order passes all (or a predefined subset) of the trade limits, the order is approved (STEP 340) and routed to the trade execution venue for execution (STEP 345). The trading gateway is updated (STEP 350) to reflect the new position(s) for that trader based on the recently executed trade and the credit provider is notified of the trade (STEP 355).

However, in some instances, the application of trading limits against a particular requested order is not straightforward, as the time units may not match. Therefore, in instances in which general limits are placed on an account or trader (e.g., no more than a particular exposure of 300 contracts during any particular peak period), the parameters of a specific trade may not match the units used to express the trade limits. As a result, certain trades that may seem to fall within a more general limit (no more than X open contracts at the end of a particular quarter) may violate a more granular, daily limit. Conversely, a limit that restricts contracts at a daily level may cause a trade for delivery during non-peak times to be rejected, even though the limits may be based on peak delivery times and the trader may have "capacity" for non-peak delivery hours.

Figure 4:
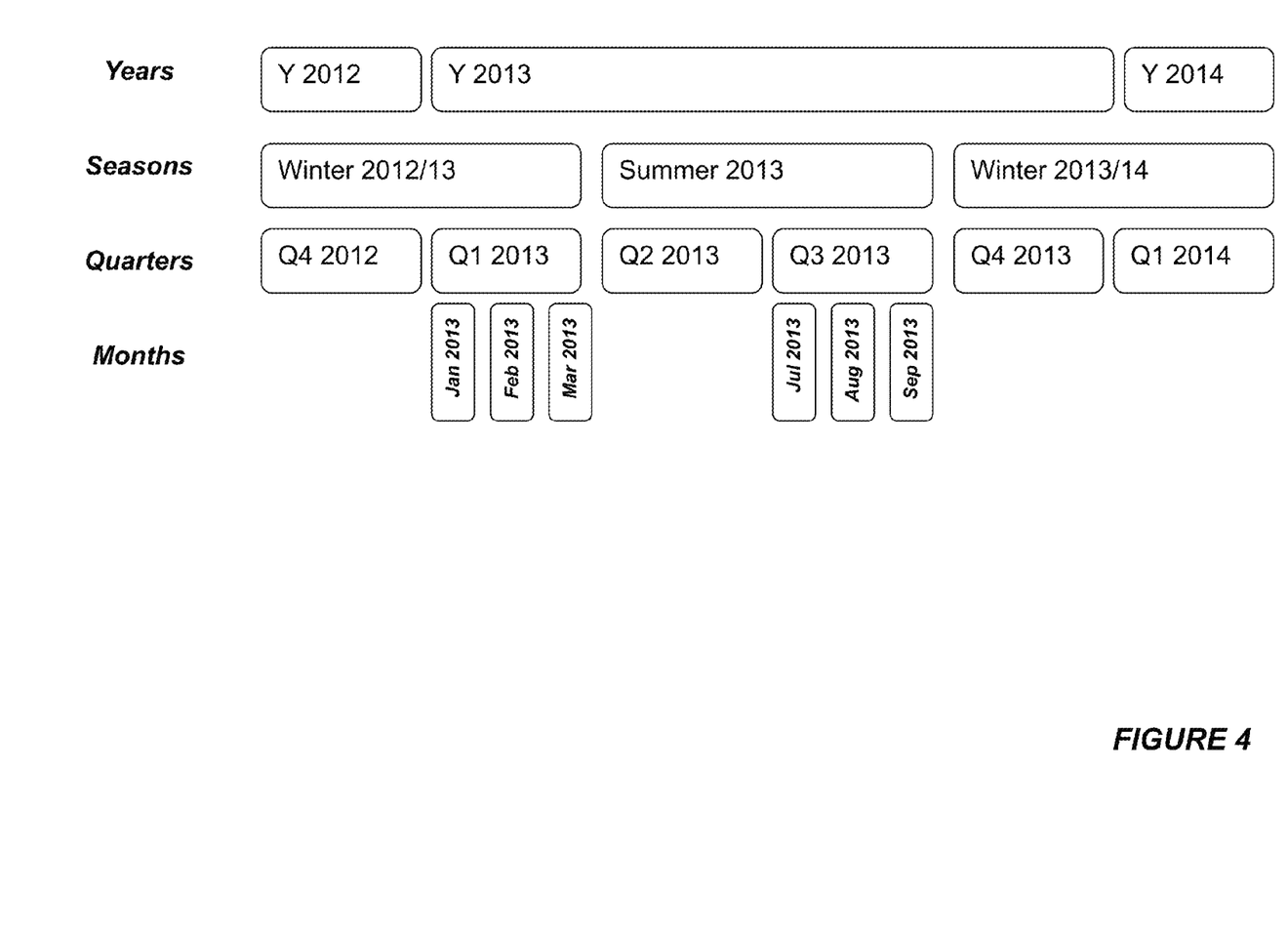
FIG. 4 illustrates the constituent period components of power delivery strip contracts in accordance with various embodiments of the invention.

At a high level, strip contracts can span multiple time units and vary in length. Referring to FIG. 4, contracts may be structured on an annual basis (YEARS), seasonal (e.g., winter and summer), quarterly, and monthly. While an individual entity such as a trader or hedge fund may desire to purchase contracts with quarterly expirations, the delivery of electricity during that quarter can vary from month to month, day to day and even hourly.

Figure 5:
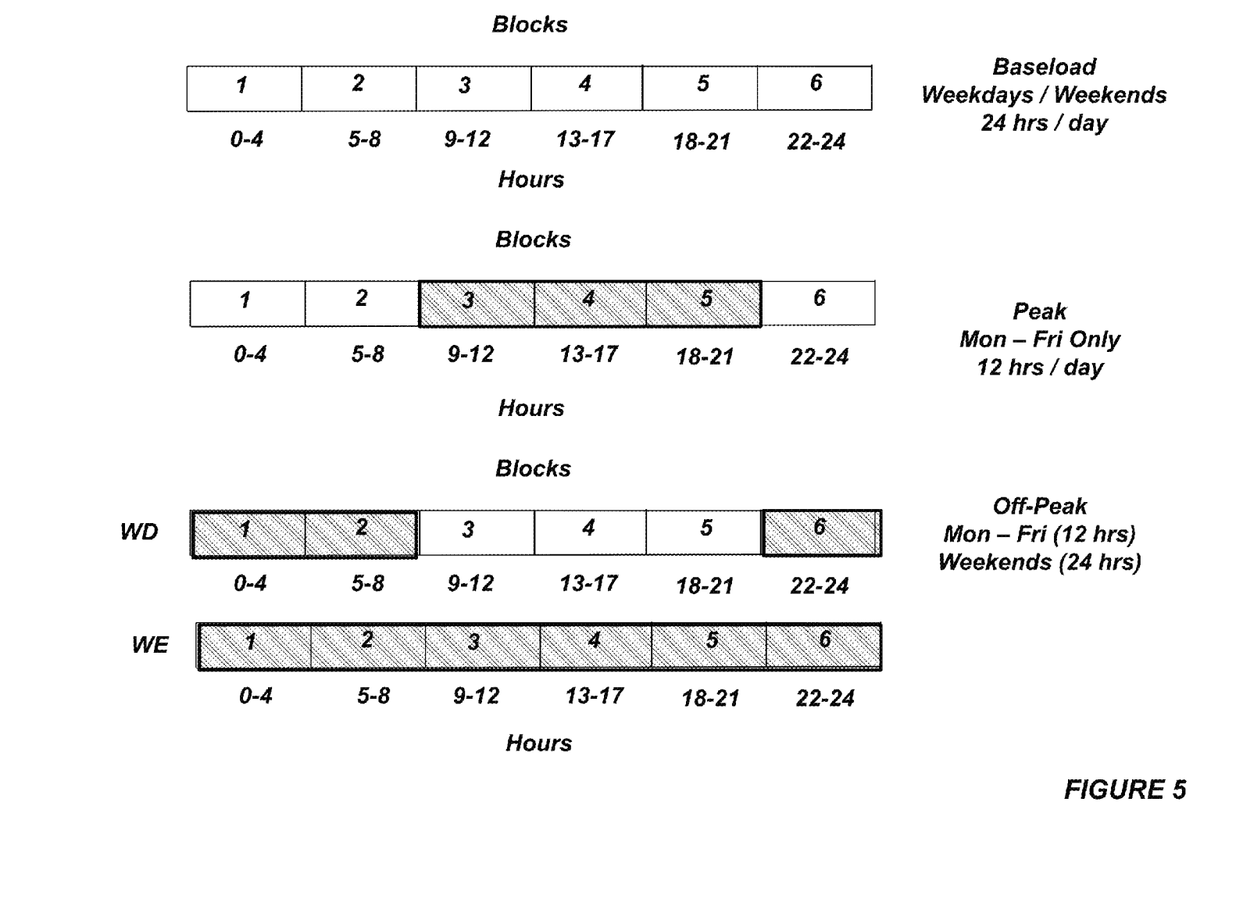
FIG. 5 illustrates the hourly peak and off-peak components of power delivery strip contracts in accordance with various embodiments of the invention.

As an example, FIG. 5 illustrates how a strip contract for delivery of electrical power can be broken into constituent blocks. This is especially critical when the contract uses a first time unit (e.g., days or weeks) but the risk limits placed on a particular position (for a trader, entity or other group) are expressed in terms of hourly blocks. The daily delivery of electricity is typically broken up into six contiguous blocks of four hours each. A contract may be derived that covers the "Baseload" delivery, which comprises delivery during each of the six four-hour blocks—essentially delivering electricity for the entirety of the day, regardless of the day. A "Peak" contract describes delivery during those periods where electricity use is at its peak, usually when businesses are operating, meaning Monday-Friday, and between the hours of 9:00 AM and 9:00 PM. Conversely, an "Off-Peak" contract may be purchased that required delivery of electricity the entirety of Saturday and Sunday, plus the "off" hours during the week (between 9:00 PM and 9:00 AM). Because of the variability of the time units these contracts, as well as the limits that may be imposed based on overall risk mitigation, the obligations resulting from a trader's existing positions may differ from one block to another.

To address this shortcoming of conventional trade limits as described above, and referring now to FIG. 6, an exemplary method for decomposing trades into their constituent time-based components and comparing those parts to defined trading limits is illustrated. As with the general case, a trader enters an order (STEP 610) at a local terminal and the order is communicated to the local risk server that maintains the current positions and maximum positional limits for that trader. The order may be for, as an example, a strip contract, which allows the sale or purchase of futures in sequential time periods in a single security. For example, a futures strip of four consecutive quarterly interest rate contracts would permit investors to lock into a fixed rate for twelve months. A monthly futures strip for delivery of electricity delivery allows the sale or purchase of electricity at a fixed price over a month, regardless of the time of day (covering peak and non-peak times). Such contracts are expressed in terms of a particular unit of time that defines how long the contract is in place and how often the owner must deliver on the contract (e.g., monthly interest payments).

Figure 6:
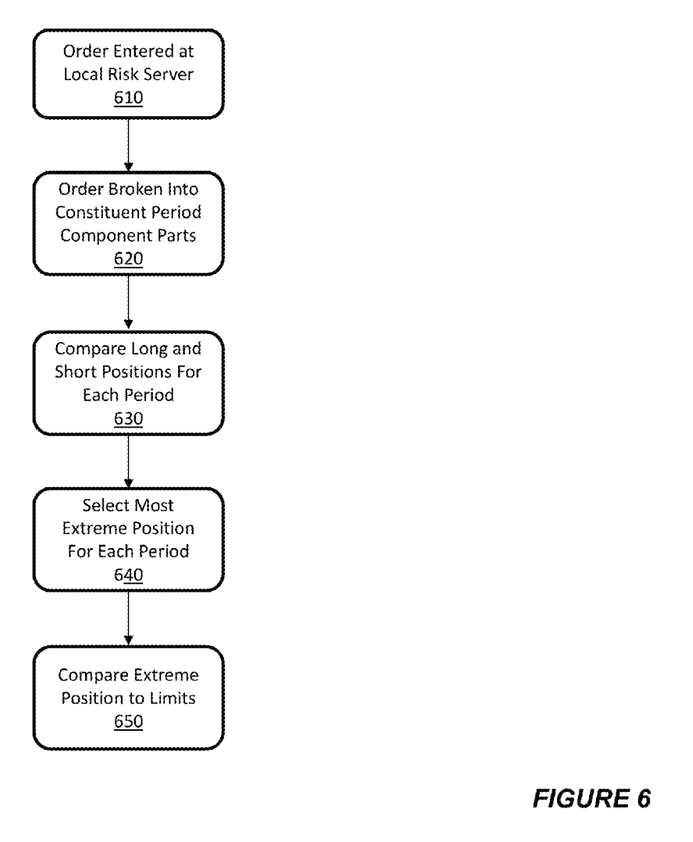
FIG. 6 is a flow chart illustrating in greater detail the steps for determining whether a requested order is to be executed when the order comprises strip contracts in accordance with one embodiment of the invention.

The limits may be expressed for an individual trader, for a group of traders (e.g., a geographical office, a division, etc.) or an entire entity (e.g., a hedge fund, pension fund, etc.). The limits may also be expressed in granular, time-based units which may differ from those used to describe the contracts being traded. In order to "match" the requested trade with the corresponding limits, the order is broken into its constituent "periods" (STEP 620) such that each unit of time may be analyzed independently. The long and short positions are reviewed for each period (STEP 630) and the most extreme (e.g., highest exposure) position for each period is selected (STEP 640) as the basis for a comparison to the trading limits. The extreme position is the absolute value of, the current position combined with all the potential long position creating orders executing, and the current position combined with all the potential short positions. The extreme position is compared to the limit(s) for that period (or sequence of periods) (STEP 650) to determine if the trade is to be allowed. If the credit provider has set asymmetric limits, i.e. if the limits set for the maximum short position in a given unit period, and the maximum long position in a given unit period are not the same, then it becomes necessary to compare both the potential extreme long position and potential extreme short position to the limits individually.

Figure 7:
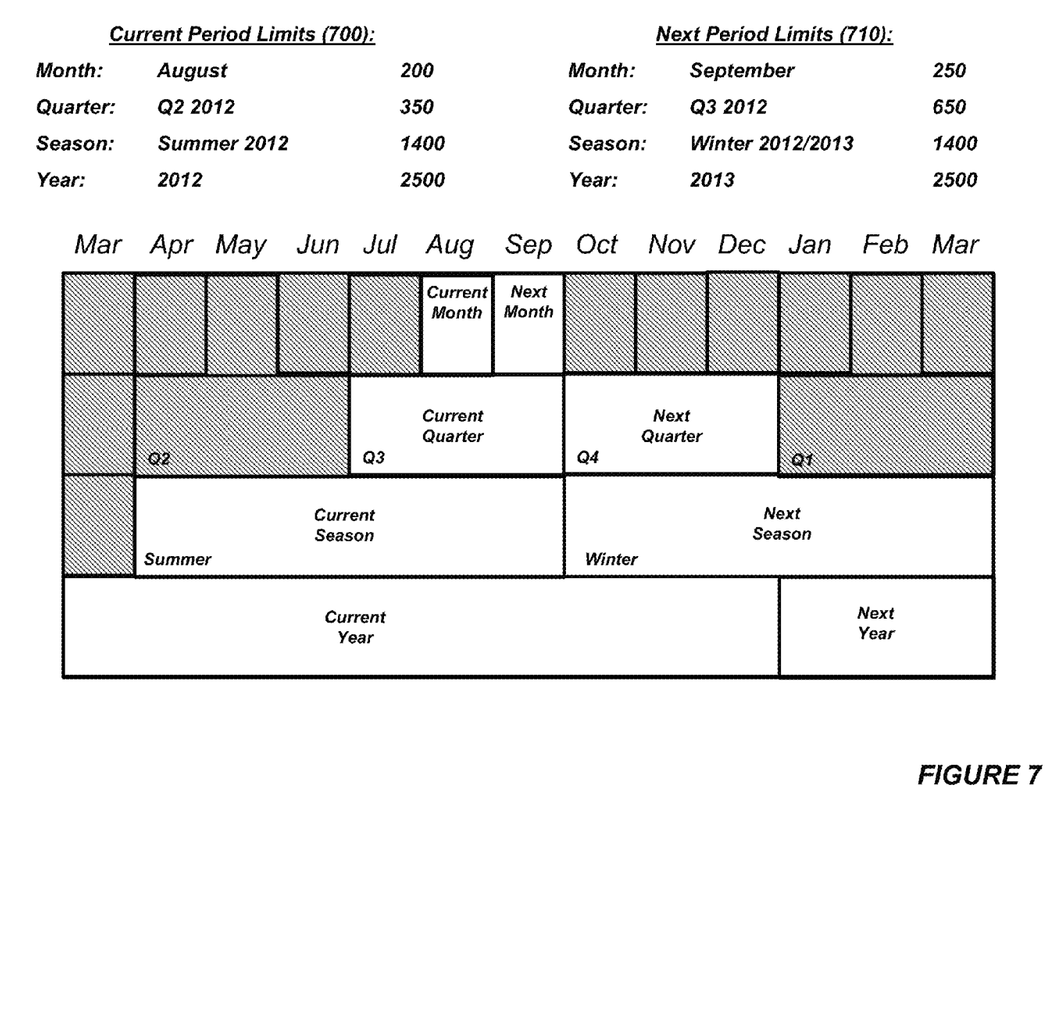
FIG. 7 illustrates the assignment of overlapping period limits to strip contracts in accordance with one embodiment of the invention.

In order to maintain and monitor positional limitations for a particular unit of time and the permitted exposures (e.g., number of instrument contracts, total delivery obligations, etc.) for those units, a current, actual position and the maximum limits for the units are entered and stored. Referring to FIG. 7 as an example, a current month (August) and next month (September) are identified. The current month also implicates other time unit limits that may be in place as it falls within the larger time unit of the current quarter (Q3), current season (summer) and current year. The next month period implicates similar larger periods (next quarter, next season) and falls within the same annual period (current year). For each period, period limits (700 and 710) may be entered to reflect a maximum exposure for that instrument and that period.

For example, and still referring to FIG. 7, the maximum exposure for August may be 200 contracts, but the maximum for the quarter may be 350. As such, a trader may believe that purchasing a quarterly contract that requires delivery of 300 units per period falls within the quarterly limit, when applied against the monthly limit for August of 200, the order violates the constraint.

Figure 8:
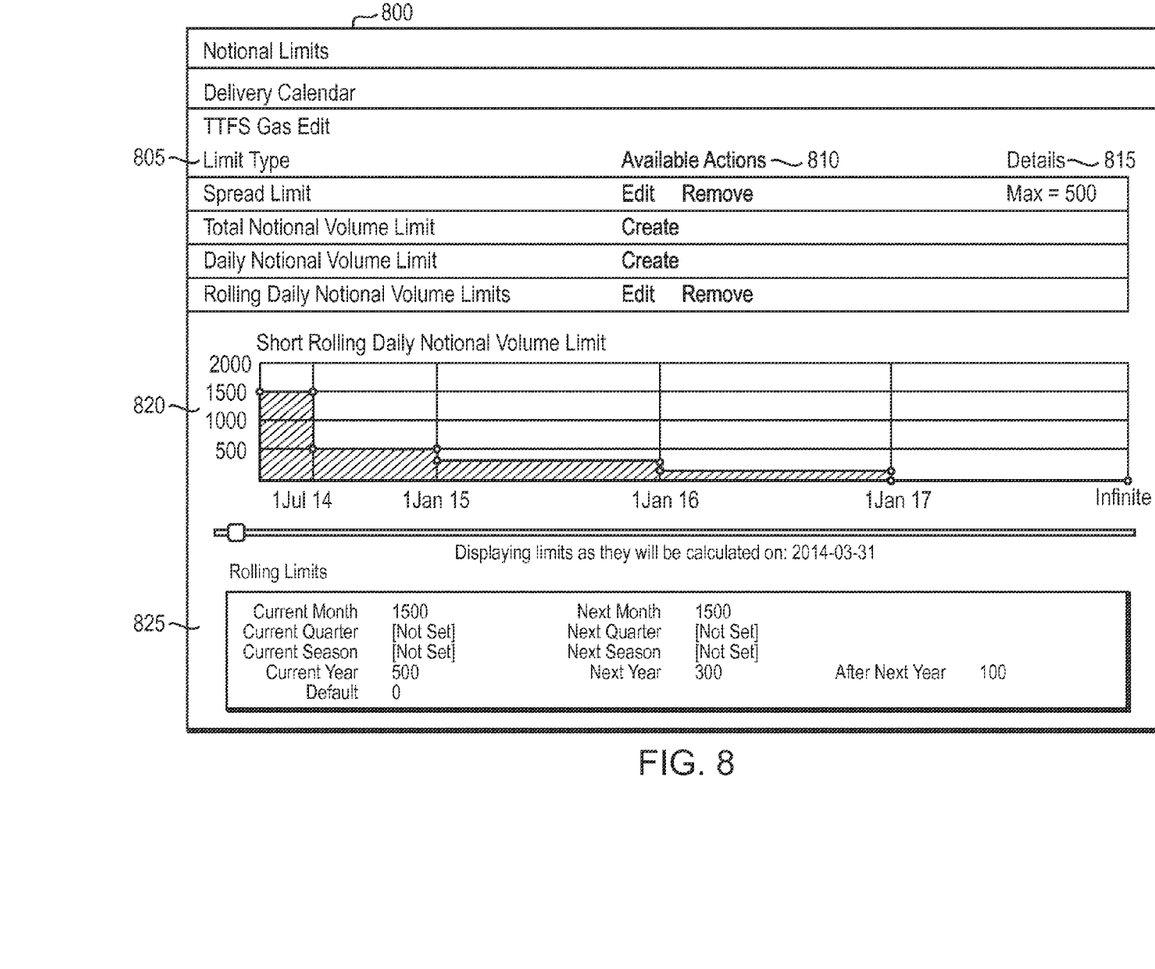
FIG. 8 is an example of a stepped graph constructed from period-based trading limits in accordance with one embodiment of the invention.

To assist users in understanding how their potential orders may implicate one or more of the time-based trading limits, a stepped graph is constructed that visually depicts the period-based limits and the effect a potential trade may have on those limits. Referring now to FIG. 8, the limit types 800 that may be imposed for a particular instrument (or grouping of instruments based on common characteristics) are listed, along with functional links 805 that allow a user to edit, create, or remove a limit. The actual limit detail 815 is also shown for each limit type. As shown, the limit types 800 may include a simple clip limit, simple volume limit, daily volume limit and daily aggregate limit. The resulting graph 820 shows, over time the maximum allowable exposure for that instrument as the upper bound on the bar for each respective time period. Using this stepped graph, a trader can see, for each time period along the x axis, the maximum exposure, or maximum positional limits, he may have as show along they axis.

By using the methods and systems described herein, traders and trading entities can take advantage of mis-matches between trading limits and the time units that are used to express the instruments that are the basis for the traded instruments. Moreover, third parties that provide the traders with access to the trade execution venues (credit providers) can use the gateway to impose limits on entities using their accounts to trade in on those venues, thereby proving the brokers with an added layer of security with respect to overall exposure in any market or markets, or for any trader or group of traders.

The invention can be embodied in other specific forms without departing from the spirit or essential characteristics thereof. The foregoing embodiments are therefore to be considered in all respects illustrative rather than limiting on the invention described herein.

What is claimed is:

1. A method of determining whether a trade order is permitted according to a predefined exposure limitation using a system comprising a data storage server, a communications server, memory, and at least one processor, the method comprising the steps of:

storing in the data storage server a set of instrument data representing an actual and a maximum permitted number of instrument units per a first unit of time;

receiving at the communication server a request to execute a trade for one or more strips of financial instruments, the strips including one or more of the instrument units, each of which is associated with a second unit of time;

constructing, using the at least one processor and computer-executable instructions stored in the memory, a stepped graph for the financial instrument based on the stored instrument data in the data storage server wherein one axis of the stepped graph represents a time period covering the strip of contracts and another axis represents a quantity of the units of the financial instrument;

comparing, using the at least one processor and computer-executable instructions stored in the memory, the received request to the stepped graph to determine whether the permitted maximum number of investment units would be violated for one or more of the first units of time should the requested trade execute; and allowing, using the at least one processor and computer-executable instructions stored in the memory, the trade to execute if no violation is determined, and not allowing the trade to execute if a violation is determined 2. The method of claim 1 wherein the financial instruments comprise swaps for delivery of electricity.

3. The method of claim 1 wherein the financial instruments comprise long-term power purchase agreements.

4. The method of claim 1 wherein the strip of contracts comprises a non-contiguous block of time.

5. The method of claim 1 wherein the instrument units comprise megawatt delivery hours.

6. The method of claim 1 wherein the second unit of time comprises a plurality of the first unit of time.

7. The method of claim 6 wherein the second unit of time comprises a quarter-year and the first unit of time comprises a month.

8. The method of claim 1 wherein the instrument data representing a maximum number of instrument units permitted per a first unit of time comprises user-specified limits for a current year, current season, current quarter, and current month.

9. The method of claim 8 wherein the instrument data representing a maximum number of instrument units permitted per a first unit of time further comprises default limits for non-current time periods.

10. The method of claim 1 wherein:
    (i) the set of instrument data representing a maximum number of instrument units permitted per a first unit of time comprises limitations on trading positions for a credit provider across a plurality of trading entities; and
    (ii) the credit provider provides the trading entities with access to an trade execution venue on which the financial instrument is traded.

11. The method of claim 1 wherein the set of instrument data representing a maximum number of instrument units permitted per a first unit of time comprises individual limitations on trading positions for each of a plurality of trading entities for which the credit provider provides access to an trade execution venue on which the financial instrument is traded.

12. A system for determining whether a trade order is permitted according to a predefined exposure limitation, the system comprising:
    a data storage server for storing a set of instrument data representing an actual and a permitted maximum number of instrument units per a first unit of time;
    a communications server for receiving a request to execute a trade for one or more strips of financial instruments, the strips including one or more of the instrument units, each of which is associated with a second unit of time;
    memory for storing computer-executable instructions; and
    at least one processor for executing the instructions stored in the memory, wherein execution of the instructions implements a trade risk management application for:
        constructing a stepped graph for the financial instrument based on the stored instrument data wherein one axis of the stepped graph represents a time period covering the strip of contracts and another axis represents a quantity of the units of the financial instrument;
        comparing the received request to the stepped graph to determine whether the permitted maximum number of investment units would be violated for one or more of the first units of time should the requested trade execute; and
        allowing the trade to execute if no violation is determined, and not allowing the trade to execute if a violation is determined 13. The system of claim 12 wherein the data storage server, communications server, memory and at least one processor are hosted by a single entity at a central facility servicing a plurality of credit providers, each credit provider providing a plurality of trading entities access to an trade execution venue on which the financial instruments are traded.

14. The system of claim 12 wherein the data storage server, communications server, memory and at least one processor are provided to each of a plurality of trading entities.

15. The system of claim 12 wherein execution of the instructions further implements a fail-safe monitor for halting all requested trades for the financial instrument should the set of instrument data representing a maximum number of instrument units become unavailable.

16. The system of claim 15 wherein execution of the instructions further implements a fail-safe monitor that disallows all requested trades for the financial instrument should the set of instrument data representing a maximum number of instrument units become unavailable.

17. An article of manufacture having computer-readable program portions embedded thereon for determining the executability of a proposed trade within a market, the program portions comprising instructions for:
    receiving a request to execute a trade for one or more strips of financial instruments, the strips including one or more of the instrument units, each of which is associated with a second unit of time;
    constructing a stepped graph for the financial instrument based on stored instrument data wherein one axis of the stepped graph represents a time period covering the strip of contracts and another axis represents a quantity of the units of the financial instrument;
    comparing the received request to the stepped graph to determine whether the permitted maximum number of investment units would be violated for one or more of the first units of time should the requested trade execute; and
    allowing the trade to execute if no violation is determined, and not allowing the trade to execute if a violation is determined.

18. The article of manufacture of claim 17 wherein the program portions further comprise instructions for transmitting the trade to a trade execution system for execution of the trade thereon.

19. The article of manufacture of claim 17 wherein program portions further comprise instructions for the storing of the set of instrument data and wherein the instrument data represents an actual and a maximum permitted number of instrument units per a first unit of time.

* * * * *